(12) United States Patent
Fullerton et al.

(10) Patent No.: US 9,212,063 B2
(45) Date of Patent: Dec. 15, 2015

(54) SYSTEM FOR PRODUCING GRAPHENE IN A MAGNETIC FIELD

(71) Applicant: Cedar Ridge Research, LLC, Huntsville, AL (US)

(72) Inventors: Larry W. Fullerton, New Hope, AL (US); Mark D. Roberts, Huntsville, AL (US)

(73) Assignee: Cedar Ridge Research, LLC, New Hope, AL (US)

( * ) Notice: Subject to any disclaimer, the term of this patent is extended or adjusted under 35 U.S.C. 154(b) by 33 days.

(21) Appl. No.: 14/275,267

(22) Filed: May 12, 2014

(65) Prior Publication Data
US 2014/0248190 A1 Sep. 4, 2014

Related U.S. Application Data

(63) Continuation-in-part of application No. 13/317,280, filed on Oct. 13, 2011, now Pat. No. 8,721,843.

(60) Provisional application No. 61/455,211, filed on Oct. 15, 2010.

(51) Int. Cl.
| | |
|---|---|
| *B01J 19/08* | (2006.01) |
| *C01B 31/04* | (2006.01) |
| *B01J 37/34* | (2006.01) |
| *B01J 19/12* | (2006.01) |
| *B82Y 30/00* | (2011.01) |
| *B82Y 40/00* | (2011.01) |

(52) U.S. Cl.
CPC ............ *C01B 31/0446* (2013.01); *B01J 19/126* (2013.01); *B01J 19/129* (2013.01); *B01J 37/342* (2013.01); *B82Y 30/00* (2013.01); *B82Y 40/00* (2013.01); *B01J 2219/002* (2013.01); *B01J 2219/0024* (2013.01); *B01J 2219/00164* (2013.01); *B01J 2219/00198* (2013.01); *B01J 2219/085* (2013.01); *B01J 2219/0886* (2013.01); *B01J 2219/0894* (2013.01)

(58) Field of Classification Search
CPC ... C01B 31/0446; B01J 37/342; B01J 19/126; B01J 19/129; B01J 2219/00164; B01J 2219/00198; B01J 2219/002; B01J 2219/0024; B01J 2219/085; B01J 2219/0886; B01J 2219/0894; B82Y 30/00; B82Y 40/00
See application file for complete search history.

(56) References Cited

PUBLICATIONS

Levchenko et al., "The large-scale production of graphene flakes using magnetically-enhanced arc discharge between carbon electrodes", Carbon 48 (2010) pp. 4556-4577.*

* cited by examiner

*Primary Examiner* — Kishor Mayekar
(74) *Attorney, Agent, or Firm* — Vector IP Law Group; Robert S. Babayi

(57) ABSTRACT

An improved system for generating graphene involves producing a plurality of ionized carbon atoms in a plasma generation chamber and providing the plurality of ionized carbon atoms to a graphene generation chamber having a magnetic structure. The graphene generation chamber generates graphene from said plurality of ionized carbon atoms over said magnetic structure such that said graphene floats over said magnetic structure due to said graphene being diamagnetic. The rate at which the plurality of ionized carbon atoms is produced is controlled to control the rate of graphene generation. The magnetic field of the magnetic structure can be controlled to control the rate at which the generated graphene moves through the graphene generation chamber until it exits as a recovered graphene product.

20 Claims, 5 Drawing Sheets

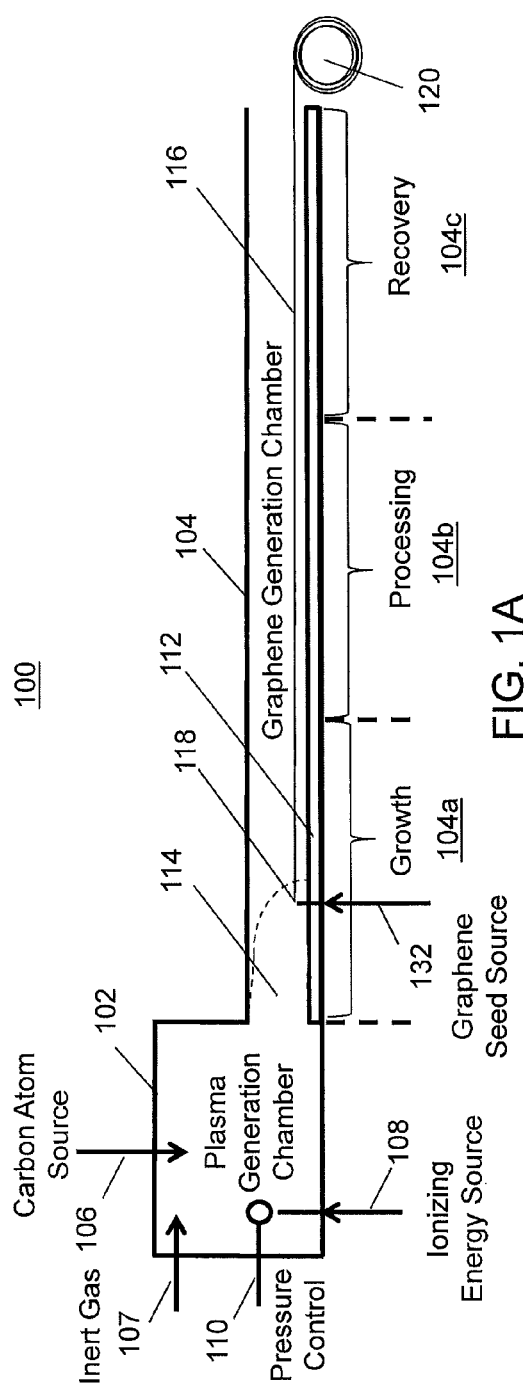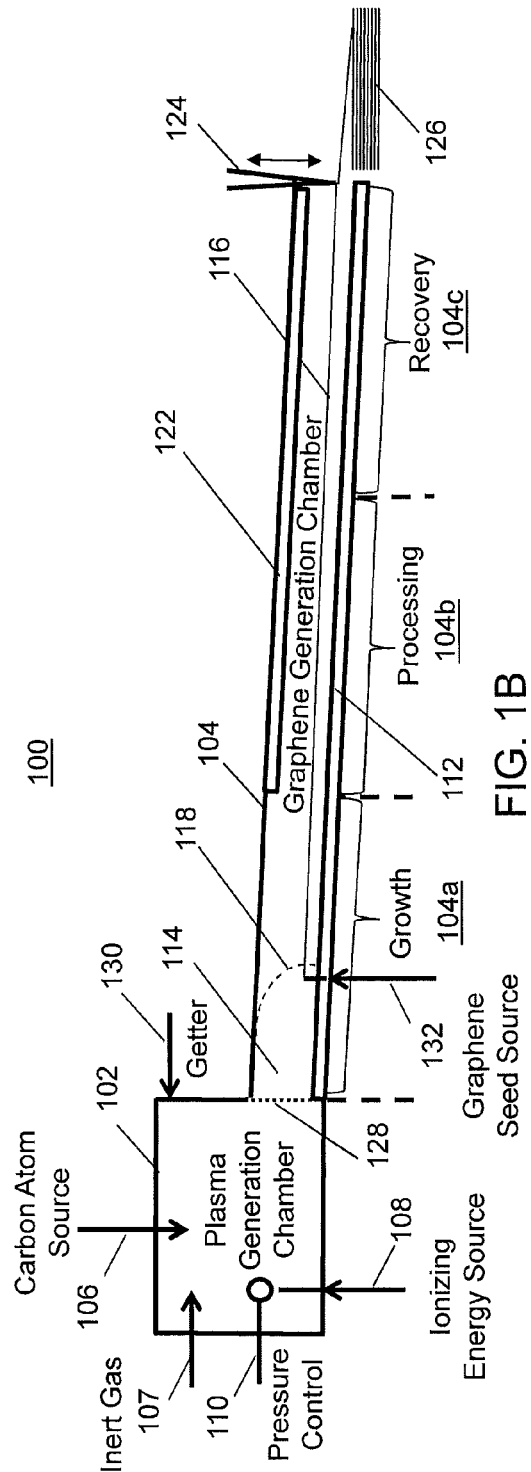

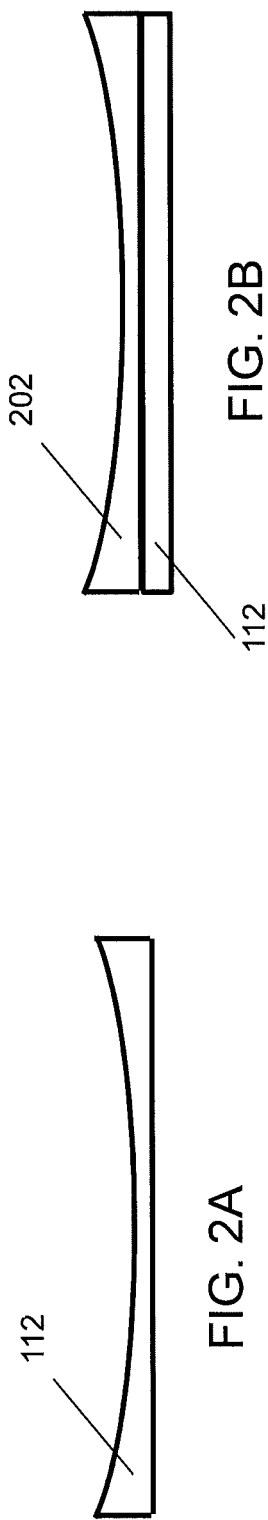
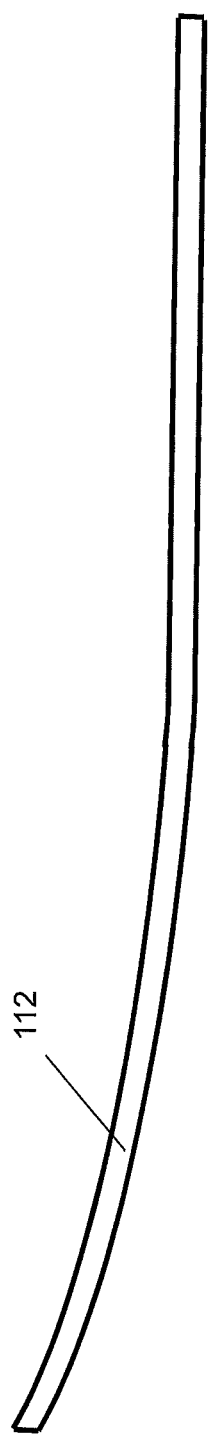
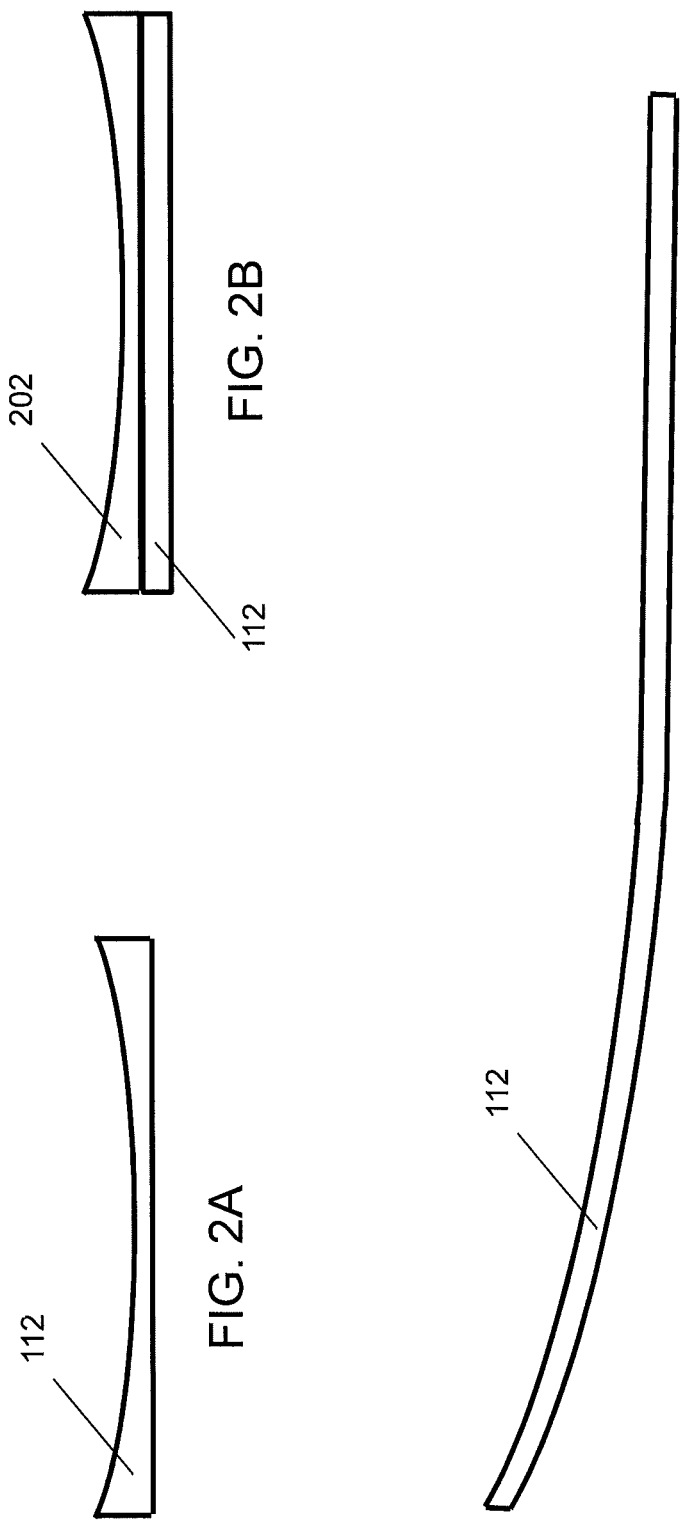
FIG. 2A
FIG. 2B
FIG. 2C
(SIDE VIEW)

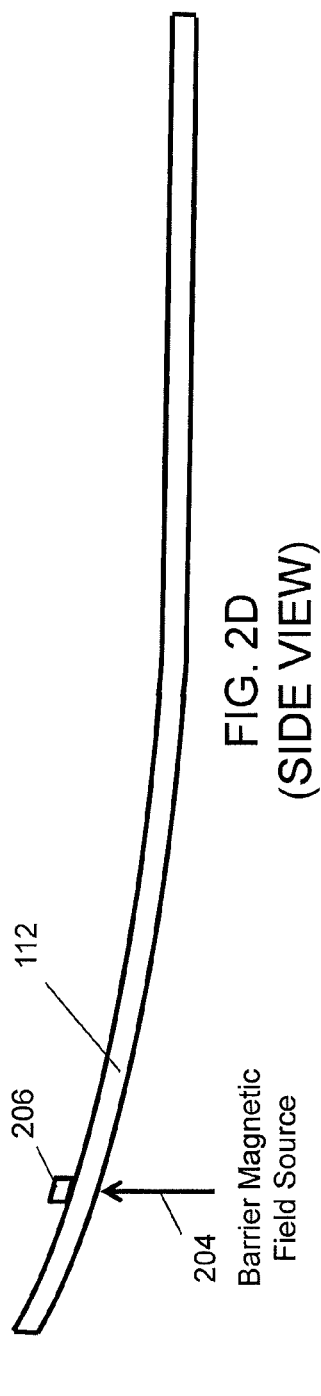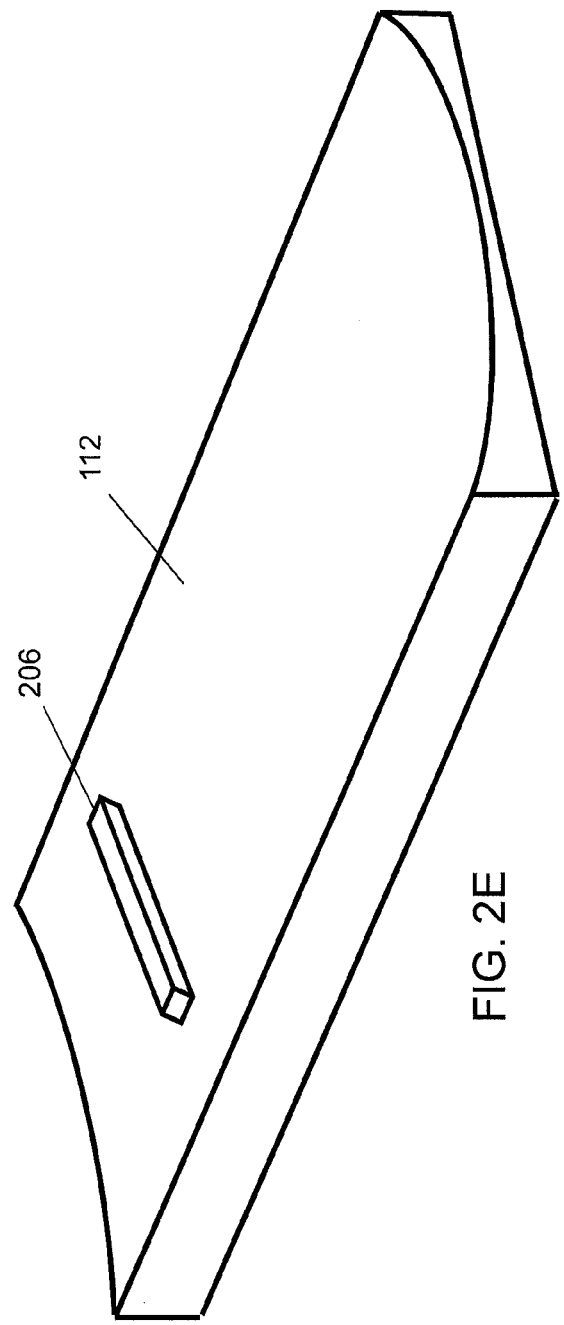

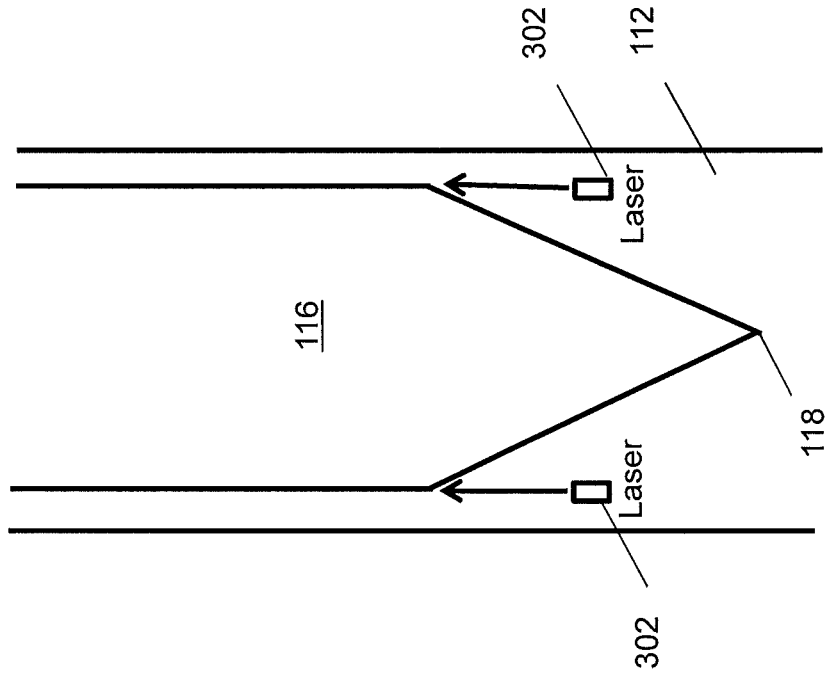
FIG. 3B (TOP VIEW)
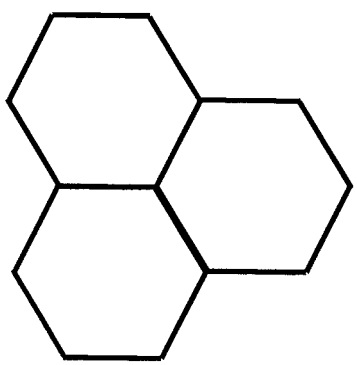
FIG. 3A (TOP VIEW)

SYSTEM FOR PRODUCING GRAPHENE IN A MAGNETIC FIELD

CROSS-REFERENCE TO RELATED APPLICATIONS

This Non-provisional Application is a continuation-in-part of Non-provisional application Ser. No. 13/317,280, filed Oct. 13, 2011, which claims the benefit of Provisional Application Ser. No. 61/455,211, filed Oct. 15, 2010 by Fullerton et al., titled "System and Method for Producing Graphene". Both applications are hereby incorporated by reference herein in their entirety.

FIELD OF THE INVENTION

The present invention relates generally to a system for generating a continuous graphene film. More particularly, the present invention relates to a system for producing graphene using a continuous manufacturing web process whereby an even plasma distribution generated by ionization of a carbon atom source produces a glow discharge of carbon atoms at a desired rate allowing the continuous growth of a graphene film floating over a magnetic field.

BACKGROUND OF THE INVENTION

Current systems and methods for producing graphene film such as using tape to remove a layer of graphene from graphite are generally ad hoc and uncontrollable. It is therefore desirable to have an improved system and method for producing graphene of sufficient quality and quantity for commercial purposes.

SUMMARY OF THE INVENTION

The present invention is an improved system for generating graphene by floating graphene as it is generated over a magnetic field. In accordance with one embodiment of the invention, a system for generating graphene in a magnetic field includes a plasma generator for producing a plurality of ionized carbon atoms, the plurality of ionized carbon atoms exiting the plasma generator as a carbon atom cloud, a graphene generation chamber for receiving the carbon atom cloud as it exits the plasma generator and generating a graphene film from the plurality of ionized carbon atoms, the graphene generation chamber having a magnetic structure that produces a magnetic field that extends from a growth portion to a recovery portion, and a graphene seed source for providing a graphene seed to an initial location over the magnetic field within the growth portion of said graphene generation chamber, the graphene film being generated over the magnetic field such that the graphene film floats over the magnetic field due to the graphene film being diamagnetic, the carbon atom cloud causing the floating graphene film to grow continuously from the initial location, the graphene generation chamber being configured such that the floating graphene film moves away from the initial location and through the graphene generation chamber until it exits the recovery portion of the graphene generation chamber as a recovered graphene product.

The system may include a carbon atom source, where the carbon atom source may include at least one of methane, carbon dioxide, or carbon monoxide. The chemical formula of the carbon atom source may have only one carbon atom.

The system may include an inert gas, where the inert gas may include at least one of helium, argon, krypton, neon, or xenon.

The system may include an ionizing energy source, wherein the ionizing energy source may include one of a radio frequency source or a high voltage source, where the radio frequency source may be a microwave signal.

The system may include at least one control system for controlling the ratio of the carbon atom source to the inert gas, controlling an absolute pressure; and controlling an energy density of a plasma resulting from the ionized energy source to control a glow discharge and a distribution of the plasma, the glow discharge producing the plurality of ionized carbon atoms. The absolute pressure may be controlled to achieve a mean free path of molecules between collisions to produce the glow discharge and an even distribution of the plasma.

The magnetic structure may be permanent magnetic material, where the permanent magnetic material may be magnetized such that the magnetic field strength of the magnetic field is strongest near the initial location of the graphene seed and the magnetic strength of the magnetic field becomes progressively weaker until it is weakest near the end of the recovery portion of the graphene generation chamber.

The magnetic structure may comprise one of electromagnets or electro-permanent magnets.

The system may include at least one laser for trimming said graphene film.

The system may include a second magnetic structure above said graphene.

The system may be configured such that the outer edges of the magnetic field along its length exhibit stronger field strengths than the center portion of the magnetic field.

The system may include a barrier magnetic field source.

The system may include a processing portion between the growth portion and the recovery portion of said graphene generation chamber for processing the graphene film, where processing may include one of lasers drawing conductive traces, applying other atoms using stereo lithography, activating carbon, or mixing impurities.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1A depicts an exemplary graphene production system;

FIG. 1B depicts another exemplary graphene production system;

FIG. 2A depicts a cross section across the width of an exemplary bowl-shaped magnetic structure;

FIG. 2B depicts a cross section across the width of an exemplary bowl-shaped magnetic field of a magnetic structure;

FIG. 2C depicts a side view of the length of an exemplary magnetic structure having a slope that decreases as the graphene film moves through the graphene generation chamber;

FIGS. 2D and 2E depict an exemplary magnetic structure like that of FIG. 2C that has an exemplary barrier magnetic field;

FIG. 3A depicts an exemplary graphene seed;

FIG. 3B depicts a top view of the growth of the graphene film from a location that a seed was introduced, where the graphene film is moving away from the location and floating above the magnetic structure of the graphene generation chamber.

DETAILED DESCRIPTION OF THE INVENTION

Figure 4:
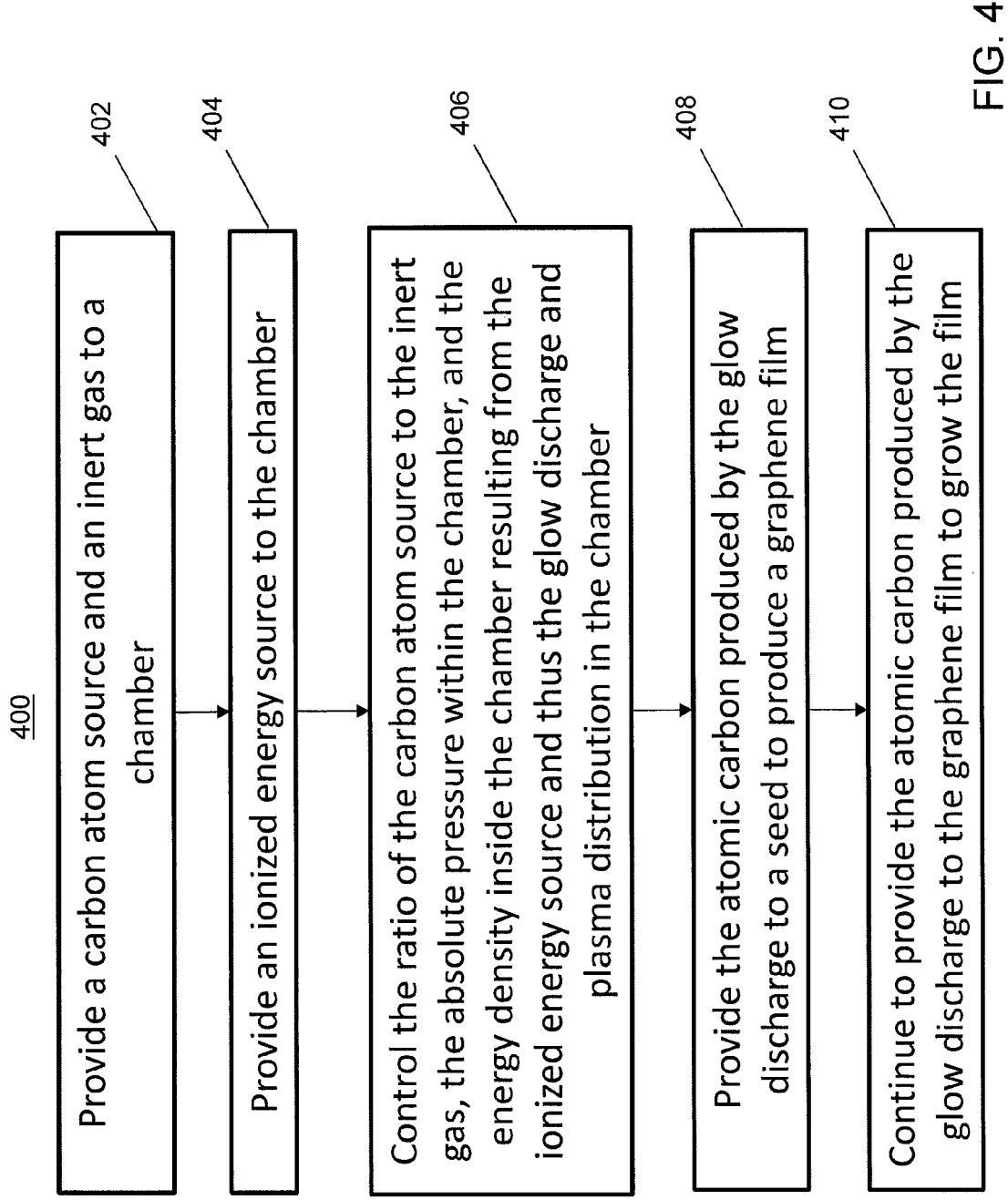
FIG. 4 depicts an exemplary method in accordance with the invention.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

The present invention provides an improved system and method for producing graphene from a source of ionized carbon atoms by generating graphene from the ionized carbon atoms over a magnetic structure such that the generated graphene floats over the magnetic structure.

FIG. 1A depicts an exemplary graphene production system 100 including a plasma generation chamber 102 and a graphene generation chamber 104. The plasma generation chamber 102 may be a so-called hot plasma generation chamber, a so-called cold plasma generation chamber, or a plasma generation chamber that produces plasma at any desired temperature. The graphene generation chamber 104 may have multiple subchambers including a growth portion 104a, one or more optional processing portions 104b, and at least one recovery portion 104c. A carbon atom source 106, for example methane ($CH_4$), an inert gas 107, such as helium, argon, krypton, neon or xenon, and an ionizing energy source 108, for example a radio frequency (RF) or high voltage (HV) source, are provided to the plasma generation chamber 102, whereby a pressure control system 110 (e.g., a vacuum pump) is used to produce an absolute pressure within the plasma generation chamber 102 necessary to achieve a mean free path of molecules between collisions sufficient to produce a glow discharge and an even plasma distribution within the plasma generation chamber 102. A resulting carbon atom cloud 114 exiting the plasma generation chamber 102 causes a graphene film 116 to grow continuously from a location of a graphene seed 118 provided by a graphene seed source 132 and introduced into the graphene generation chamber 104. The continuously growing graphene film 116, which is diamagnetic, floats over a magnetic structure 112 and moves through the graphene production chamber until it exits the graphene generation chamber 104 as a recovered graphene product, for example, a roll of graphene 120.

One skilled in the art will recognize that many different types of carbon atom sources could be used with the invention such as $CH_4$ $CO_2$, CO, and the like. In a preferred embodiment, the carbon atom source would have only one carbon atom to simplify the stripping of the atom. One skilled in the art will also recognize that various ionizing energy sources could be used, for example, a 2.4 Ghz (microwave) signal. Furthermore, one skilled in the art will recognize that various graphene seed sources could be used such as a highly ordered pyrolytic graphite (HOPG) source, where any one of various types of automated, semi-automated, or manual methods can be employed to provide a graphene seed 118 from the graphene seed source 132 at a desired location in the graphene generation chamber 104.

As shown in FIG. 1A, the graphene film 116 may be pulled down the graphene generation chamber 104 as a result of a rolling process used to produce the roll of graphene 120, whereby a control system (not shown) controls the turning rate of the roll of graphene 120 to correspond to the rate of growth of the graphene film 116. The control system also controls the rate of growth of the graphene film 116 by controlling the ratio of the carbon atom source 106 to the inert gas 107, the absolute pressure within the chamber 102, and the energy density inside the chamber resulting from the ionizing energy source 108 and thus the glow discharge and plasma distribution in the plasma generation chamber 102. Generally, a control system can be a closed loop control system involving sensors and the like to measure the parameters of the system 100 being controlled.

In one alternative arrangement, an atomic beam of carbon can be accelerated in a conventional manner and then focused using electric and/or magnetic lensing. Furthermore, it can be passed through an inhomogeneous magnetic field acting in a manner similar to a spectrometer to enable separation (e.g., for atomic species and isotopic purification purposes) of different atoms to make an isotropically pure source beam (of carbon atoms) thereby resulting in a specific graphene composition.

In still another alternative arrangement, atomic beams could be used to interlace other types of atoms on the growth edge of the graphene film to produce composite materials much like weaving a blanket. Similarly, television raster technique might be employed. Many such similar techniques are possible as long as enough graphene is included in such composite materials whereby the graphene portion of the material will enable it to float above the magnetic structure and thereby move through and exit the graphene generation chamber as would a graphene-only film.

In yet still another alternative arrangement, the generated graphene film is merely a binder included to cause any other material of interest to be processed via the invention such that it floats through the graphene generation chamber.

One or more processing portions 104b may reside between the growth portion 104a and the recovery portion 104c of the graphene generation chamber 104. Various types of processing of the graphene film 116 are possible including, for example, lasers drawing conductive circuit board traces, applying other atoms using stereo lithography to build nanostructures and nanomachines, activating carbon and mixing impurities to produce semiconductors, etc.

Under one arrangement, the magnetic structure 112 is made up of multiple sources of permanent magnetic material magnetized such that the magnetic field strength of the sources of the magnetic structure 112 are strongest near the location of the graphene seed 118 and the magnetic strength of the sources of the magnetic structure 112 become progressively weaker until they are weakest near the end of the recovery portion 104c of the graphene generation chamber 104 causing a downward slope of the graphene film 116 that causes gravitational forces to move the graphene film through and exit the graphene generation chamber 104. Under another arrangement the magnetic structure 112 comprises electromagnets or electro-permanent magnets whereby the magnetic field strength along the magnetic structure 112 is varied to cause gravitational forces to move the graphene film 116 through and exit the graphene generation chamber 104. Under still arrangement, the control system varies the slope of graphene film 116 by controlling the magnetic field strength along the magnetic structure 112 so as to control (i.e., speed up or slow down) the rate at which the graphene film 116 moves through and exits the graphene generation chamber 104. Under yet another arrangement, one or more slopes of one or more parts of the magnetic structure 112 are mechanically controlled by the control system so as to control the effect of gravitational forces and thereby the rate at which the graphene film 116 moves through and exits the graphene generation chamber 104.

FIG. 1B depicts another exemplary graphene production system 100, which is similar to the graphene production system of FIG. 1A except the graphene generation chamber is slanted so that gravitational forces can be used to cause the graphite film to move through and exit the graphene generation chamber 104. The intent of this curvature is to create negative feedback to prevent the film from progressing backward into the ionization chamber. Other variations to the system 100 include a second magnetic structure 122, which could be used to control the height of the graphene film 116 particularly during processing but also during other portions of the chamber 104 such as within a recovery portion 104c. As depicted, a cutting mechanism 124 cuts the graphene film 116 into a recovered graphene product, for example, a stack of graphene films 126.

Also shown in FIG. 1B is an optional shield 128 used to prevent the ionization energy source from exiting the plasma generation chamber 102 and entering the graphene growth chamber 104. Alternatively, the opening between the plasma generation chamber 102 and the graphene growth chamber 104 can be selected based on waveguide cutoff properties to not allow signals. An optional getter 130 is also depicted, which can be used to remove atomic hydrogen from the plasma generation chamber 102.

One skilled in the art will recognize that magnetization techniques can be employed to produce magnetic field characteristics for the magnetic structure 112 (and optionally the second magnetic structure 122) that assist in controlling movement and also growth characteristics of the graphene film 116. For example, the outer edges of the magnetic structure 112 along its length could exhibit stronger field strengths than the center portion so that the graphene film could be more easily maintained within the boundaries of the magnetic structure 112. FIG. 2A depicts a cross section of an exemplary bowl-shaped magnetic structure 112, which could alternatively be a bowl-shaped magnetic field 202 of a magnetic structure 112 such as shown in FIG. 2B. FIG. 2C depicts a side view of the length of an exemplary magnetic structure 112 having a slope that decreases as the graphene film 116 moves through the graphene generation chamber 104. Such a design is intended to support initial production of a graphene film 116 from a seed 118 so as to prevent the seed from growing towards the plasma generation chamber 102. FIGS. 2D and 2E depict an exemplary magnetic structure 112 like that of FIG. 2C that has a barrier magnetic field 204 produced by a barrier magnetic field source 206. The barrier magnetic field 204 may be used to prevent or limit movement of the graphene film 116 down the magnetic structure 112 such as during the initial stage of graphene film growth, where it may be desirable that the graphene seed 118 be stationary or substantially stationary.

One skilled in the art will recognize that various types of barrier magnetic fields 204 can be employed having various magnetic field shapes, which can be produced using electromagnets and/or permanent magnets, where a barrier magnetic field can be reduced or removed or otherwise varied so as to control or prevent movement of a graphene film 116.

FIG. 3A depicts an exemplary graphene seed 300.

FIG. 3B depicts a top view of growth of the graphene film 116 from a location 118 that a seed was introduced into the graphene generation chamber 104, where the graphene film 116 is moving away from the location 118 and floating above the magnetic structure 112 of the graphene generation chamber 104. As shown, lasers 302 can be used to trim the graphene film 116 once outside the growth portion 104a of the graphene generation chamber 104 so as to achieve a desired shape. Eventually the growth edge will approach the shape of a flat growth edge.

One skilled in the art will recognize that various geometries for the graphene are possible such as carbon fiber nanotubes having different spiral (tilt) angles and the like where the seed has a desired number of atoms and atom tile along a cylinder. One skilled in the art will also recognize that different types of atoms such as boron can be used in place of carbon atoms in accordance with the invention. One skilled in the art will recognize that the seed may be initially oriented to produce a film whose hexagonal structure is grown at a preferred angle.

FIG. 4 depicts an exemplary method 400 in accordance with the invention. The method 400 includes five steps. The first step 402 is to provide a carbon atom source and an inert gas to a chamber. The second step 404 is to provide an ionizing energy source to the chamber. The third step 406 is to control the ratio of the carbon atom source to the inert gas, the absolute pressure within the chamber, and the energy density inside the chamber resulting from the ionizing energy source and thus the glow discharge and plasma distribution in the chamber. The fourth step 408 is to provide the ionized atomic carbon produced by the glow discharge to a seed to produce a graphene film and the fifth step 410 is to continue to provide the atomic carbon produced by the glow discharge to the graphene film to grow the film.

While particular embodiments of the invention have been described, it will be understood, however, that the invention is not limited thereto, since modifications may be made by those skilled in the art, particularly in light of the foregoing teachings.

The invention claimed is:

1. A system for generating graphene in a magnetic field, comprising:
   a plasma generator configured to produce a plurality of ionized carbon atoms, said plurality of ionized carbon atoms exiting said plasma generator as a carbon atom cloud;
   a graphene generation chamber coupled to said plasma generator and configured to receive said carbon atom cloud as it exits said plasma generator, said graphene generation chamber being configured to generate a graphene film from said plurality of ionized carbon atoms, said graphene generation chamber comprising:
      a growth portion;
      a recovery portion; and
      a magnetic structure that produces a magnetic field extending from said growth portion to said recovery portion; and
   a graphene seed source configured to provide a graphene seed to an initial location over said magnetic field within said growth portion of said graphene generation chamber, said graphene film being generated over said magnetic field such that said graphene film floats over said magnetic field due to said graphene film being diamagnetic, said carbon atom cloud causing said floating graphene film to grow continuously from said initial location, said graphene generation chamber being configured such that the floating graphene film moves away from said initial location and through said graphene generation chamber until it exits said recovery portion of said graphene generation chamber as a recovered graphene product.

2. The system of claim 1, further comprising:
   a carbon atom source.

3. The system of claim 2, wherein said carbon atom comprises at least one of methane, carbon dioxide, or carbon monoxide.

4. The system of claim 2, wherein the chemical formula of said carbon atom has only one carbon atom.

5. The system of claim 1, further comprising:
an inert gas source.

6. The system of claim 5, which said inert gas comprises at least one of helium, argon, krypton, neon, or xenon.

7. The system of claim 1, further comprising:
an ionizing energy source.

8. The system of claim 7, wherein said ionizing energy source comprises one of a radio frequency source or a high voltage source.

9. The system of claim 8, wherein said radio frequency source is a microwave source.

10. The system of claim 1, further comprising:
a carbon atom source;
an inert gas source;
an ionizing energy source; and
at least one control system configured to control ratio of said carbon atom to said inert gas, controlling an absolute pressure; and controlling an energy density of a plasma resulting from said ionized energy source to control a glow discharge and a distribution of said plasma, said glow discharge producing said plurality of ionized carbon atoms.

11. The system of claim 10, wherein said absolute pressure is controlled to achieve a mean free path of molecules between collisions to produce said glow discharge and an even distribution of said plasma.

12. The system of claim 1, wherein said magnetic structure comprises permanent magnetic material.

13. The system of claim 12, wherein said permanent magnetic material is magnetized such that the magnetic field strength of the magnetic field is strongest near the initial location of the graphene seed and the magnetic strength of the magnetic field becomes progressively weaker until it is weakest near the end of said recovery portion of said graphene generation chamber.

14. The system of claim 1, wherein said magnetic structure comprises one of electromagnets or electro-permanent magnets.

15. The system of claim 1, further comprising:
at least one laser for trimming said graphene film.

16. The system of claim 1, said grapheme generation chamber further comprising:
a second magnetic structure adapted to be above said graphene film.

17. The system of claim 1, wherein outer edges of said magnetic field along its length exhibit stronger field strengths compared to a field strength of a center portion of said magnetic field.

18. The system of claim 1, further comprising:
a barrier magnetic field source.

19. The system of claim 1, said graphene generation chamber further comprising:
a processing portion between said growth portion and said recovery portion of said graphene generation chamber for processing said graphene film.

20. The system of claim 19, wherein said processing portion comprises one of lasers drawing conductive traces, applying other atoms using stereo lithography, activating carbon, or mixing impurities.

* * * * *